United States Patent [19]

Krauss et al.

[11] 4,417,966

[45] Nov. 29, 1983

[54] APPARATUS AND METHOD OF PRODUCING OZONE

[75] Inventors: Ralf Krauss, Palma de Mallorca, Spain; Rainer Koehne, Essen, Fed. Rep. of Germany

[73] Assignee: Innovatron Krauss & Co., Switzerland

[21] Appl. No.: 320,497

[22] Filed: Nov. 12, 1981

[30] Foreign Application Priority Data

Nov. 15, 1980 [DE] Fed. Rep. of Germany ....... 3043176

[51] Int. Cl.³ .............................................. C01B 13/10
[52] U.S. Cl. ................................ 204/176; 422/186.18; 422/186.19; 422/186.15
[58] Field of Search .................... 204/176; 422/186.18, 422/186.19, 186.15

[56] References Cited

U.S. PATENT DOCUMENTS

| | | | |
|---|---|---|---|
| 898,506 | 9/1908 | Quain | 422/186.18 |
| 1,085,579 | 1/1914 | Held | 422/186.18 |
| 1,358,443 | 11/1920 | Held | 422/186.18 |
| 1,505,669 | 8/1924 | Quain | 422/186.18 |
| 1,965,187 | 7/1934 | Hartman | 422/186.18 |
| 4,051,045 | 9/1977 | Yamamoto | 422/186.18 |

Primary Examiner—John F. Niebling
Attorney, Agent, or Firm—Steele, Gould & Fried

[57] ABSTRACT

An apparatus for producing ozone, comprising: a first electrode; a second, annular electrode surrounding the first electrode and spaced therefrom; a first tubular wall of electrically insulating material disposed between the electrodes; a first sealed glow discharge chamber surrounding one of the electrodes, formed at least in part by the tubular wall, and filled with a charge of an ionizable gas; an ozonization chamber disposed between the electrodes, formed at least in part by the tubular wall, and having an inlet for an oxygen charged medium and an outlet for the medium as ozone enriched; and, electrical conductors for connecting the electrodes to an electrical power source, whereby ionized gas in the glow discharge chamber forms a plasma electrode. The apparatus is preferably energized by applying an electrical potential between the electrodes in the form of voltage pulses at a frequency in the range of 10 to 60 KHz. In further embodiments, both electrodes are disposed in sealed glow discharge chambers filled with an ionizable gas, whereby the apparatus functions with at least two plasma electrodes.

11 Claims, 6 Drawing Figures

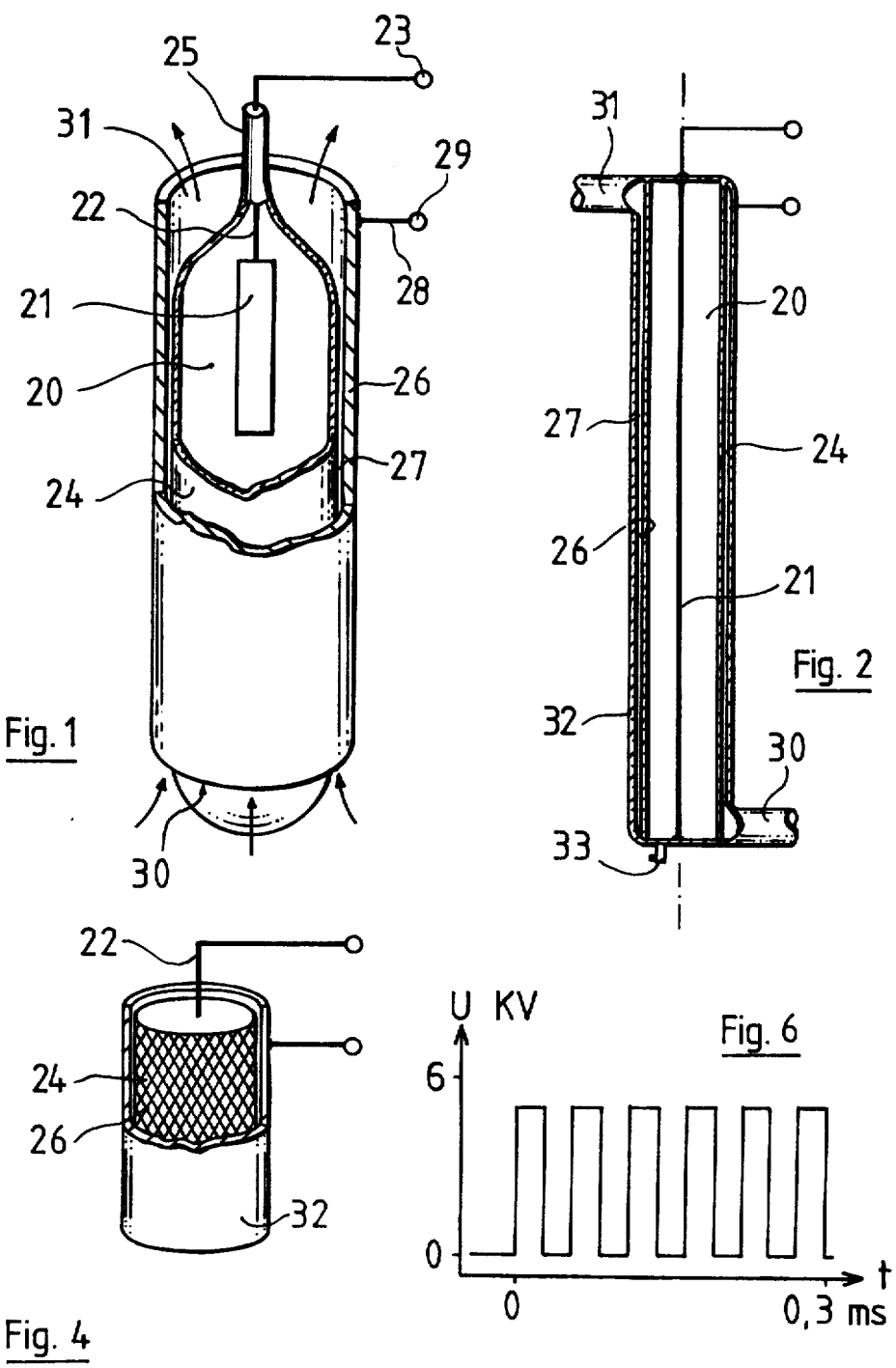

APPARATUS AND METHOD OF PRODUCING OZONE

BACKGROUND OF THE INVENTION

The invention relates to an apparatus for producing ozone comprising two spaced electrodes having conductors for connection to a voltage source of alternating amplitude and comprising at least one electrically-insulating separator wall, preferably of glass, between these electrodes and having at one side an ozonisation chamber connected to an inlet for an oxygen-charged medium, particularly air, and with an outlet for the ozone-enriched medium, together with a method of producing ozone by means of an apparatus of this nature.

Ozone is generally formed by the action of oxygen atoms on oxygen molecules. The splitting of an oxygen molecule can for example be achieved by applying electrical, optical chemical or thermal energy. The invention relates in particular to the splitting of oxygen by means of electrical energy, the voltage applied between the two electrodes (electrode and counterelectrode) having an amplitude which varies with time, for example an alternating voltage or a pulsating direct voltage.

Known apparatus of the type first set forth above derive for the most part from the "Siemens Ozonisator". This consists in principle of two interfitted, coaxial glass tubes with a tubular ozonisation chamber between them. Water is disposed at least at one side of a separator wall facing away from the ozonisation chamber.

Although apparatus of this nature, which in the meantime have been much improved, have been extensively used on a large scale for water treatment in the preparation of drinking water, for purification and sterilization of swimming baths, in the production of oxygen carriers for rocket impellants etc., the degree of efficiency thereof is not yet satisfactory and lies at this time, even in the case of the best plants, still less than 50% of the degree of efficiency which is theoretically achievable, even starting from the theoretically possible energy consumption of about 2.4 W.h per gramme ozone. Typically the degree of efficiency of known apparatus of the kind first set forth above is about 25%. The major proportion of the energy applied is converted into heat which has to be dissipated by cooling water. A temperature increase of the oxygen-containing medium which is fed into the inlet of the ozonisation chamber to values over 38° Celsius at the outlet must be prevented because as temperature increases the liklihood of decomposition of the ozone is raised.

Further, the priming and operating voltages of the known apparatus reach relatively high values, particularly frequently above 20 kilovolts, to make the yield a maximum in the parameters quoted. Insulation problems arise where there are high priming and operating voltages of the nature set out and these are further increased with the presence of cooling water and steam. Additionally, also detrimental, is the formation of nitrous oxides which notoriously appear at operating voltages over 15 kilovolt and in particular are damaging in water treatment by means of ozone because nitrous acid and subsequently nitric acid may be formed when the ozone together with the unwnted nitrous oxides are introduced into water. Coolant problems may also arise.

Finally ozone production which on the face of it is small with the known apparatus has to be relatively large in size. This in turn increases the costs of manufacture and the costs involved in practical terms.

It has been previously known to apply to a Siemens Ozonisator instead of a normally used alternating voltage a voltage of varying amplitude, and in particular a pulsed voltage. It has been found that because of the increased number of electrical excitations per unit time the yield in ozone is increased. The higher number of excitation phenomena possibly may be attributed to a greater promise of ozone formation or a longer period of dwell of the split oxygen molecular in their atomic condition. The introduction of voltages with frequency in the lower frequency range leads however, in the case of the known apparatus, to high electrical losses, particularly in the ozone producing apparatus device itself so that in toto higher frequencies in the voltage applied to the electrodes gives no gain to the ozonisation appliances with alternating voltage or for operation when pulsating direct voltage could not therefore be successful.

SUMMARY OF THE INVENTION

It is an object of the present invention to obviate the disadvantages of the apparatus of the kind set forth above for producing ozone and also to avoid the defects of the known operating process and to provide an apparatus which gives an increase degree of efficiency, although this can be done with an adequately small and safe priming operating voltage, which can be of compact form and relible over long use, and also a method of operating apparatus of this kind.

This object is achieved in an apparatus of the type set forth above by the fact that arranged at the other side of the separator wall is a glow-discharge chamber in which the associated electrode is located and which is filled with gas adapted to be ionised by means of the applied voltage field.

The object is further met by a method of producing ozone which is characterised by the fact that a voltage of pulse form and with pulse frequency in the kilohertz range, preferably ten to sixteen KHz is used etween the electrode and the counter electrode. A binary signal has proven particularly advantageous, and thus unipolar pulses of rectangular form, with the leading edge flank as steep as possible.

The apparatus according to the invention manifests a very small capacity between the two electrodes, and both in the case of a direct current measurement and also in the method prescribed with a voltage of higher frequency. The small capacity is shown even qualitatively by a relatively large distance, and consequently a relatively high spacing, between the two electrodes. This small capacity is a substantial advantage of the invention and means that the electrical losses are small even at high frequencies. In practical implementation of the apparatus according to the invention a gas-discharge takes place within the glow-discharge chamber, resulting in the formation of a plasma in the glow-discharge chamber with the low pressure of the gas therein. The apparatus according to the invention can therefore be described as having one electrode in the form of a plasma electrode.

The aparatus of the invention is typified by an unusually high yield. This is surprising having regard to the long development of ozonisation apparatus because the degrees of efficiency which have hitherto been reached are thought to have a kind of threshold. The individual physical phenomena arising in the glow-discharge chamber and the adjoining dielectric separator wall are not yet fully understood. It is thought probable tht the surprisingly high degree of efficiency of the apparatus of the invention which occurs particularly with operating voltages in the Kilohertz range is possibly to be explained by a resonance phenomenon in the plasma and possibly also in the oxygen. Moreover, phase shifts between the excitation voltage and the voltage which actually prevails in the ozonisation chamber may also play a decisive role. This may also explain the reduced energy requirement in the situation of large amounts of ozone here produced in comparison with apparatus according to the prior art. The extent to which molecule vibrations in the oxygen and possibly in the plasma play a part is as yet unexplained.

The substantially smaller heat production in the apparatus of this invention is of particular advantage, and in particular much less heat is applied to the electrodes than is the case with prior art apparatus. As a result of this, cooling devices can be dispensed with in smaller plants. Furthermore the electrode material in the apparatus of this invention is not critical because that which forms an electrode does not come into contact with the medium to be ozonised. Therefore, it is protected against contact and oxidation.

The apparatus of the invention is very simple and inexpensive in construction and maintenance. It is of very light weight and is suitable both for small plants (room ozonisators) and large industrial plants. What favors the simple manufacture and maintenance is that practically no gas is used in the glow-discharge chamber, so that the latter can be hermetically sealed.

The apparatus of the invention is preferably made up of tubes because this enables use of a permanently closed gas discharge chamber, or one which is accessible through a vacuum cock, which is under low pressure and can be made in simple and favorable manner. In particular, as a result of this the wall thickness of the separator wall can be made small and this further increases the yield. The electrodes disposed in the glow-discharge chamber are hereinafter referred to as "electrode". The other electrode is designated "counter electrode" and is only large enough to ensure the maintenance of the gas discharge. Net-like electrodes have proven particularly useful. The conductor to the electrode is passed through an outlying part of the separator wall, and in the preferred construction of the separator wall, as a glass tube, the conductor is taken out through a cylindrical surface of the closed chamber. The counter electrode is located either at a small distance from the outer wall of this tube enclosing the glow-discharge chamber or is applied directly to the outer wall of the tube, for instance on an insulating layer which is provided on this wall. In the latter case the electrode has positive perforations, it is of net-like form, due to helical lines in the form of a perforate plate or the like.

In a mechanical reverse of this the cylindrical inner chamber of the tubular separator wall can shaped the ozonising chamber. In this case the glow-discharge chamber is located outside the tubular separator wall, for example in an annular or hose-form shape chamber. With this construction, an ozonisation chamber can also form a boundary for the annular chamber on the outer wall. Two counter electrodes are then necessary, one for the ozonisation chamber in the interior of the tubular glow-discharge chamber and one for the ozonisation chamber outside this particular chamber. Both counter electrodes may be joined together, but it is particularly advantageous only to apply positive pulses to one electrode and only negative pulses to the other electrode.

What is decisive for the operation of the apparatus according to the invention is a relatively high frequency of the applied operating voltage. Frequencies thirty or forty KHz have proven particularly advantageous. Although the use of alternating voltages and direct alternating voltages is possible, individual pulses of rectangular shape are preferred as providing better yields.

Further advantages of the invention are disclosed by the claims hereto and are to be found in the following description.

BRIEF DESCRIPTION OF THE DRAWINGS

FIG. 1 is a perspective view of the apparatus, this being partly cut away in the direction of the longitudinal axis, FIG. 2 is a longitudinal section through a second embodiment, FIG. 4 is a perspective illustration of an apparatus with a counter electrode mounted on the separator wall, FIG. 6 is an illustration of the time sequence of the voltage applied to the electrodes.

DETAILED DESCRIPTION OF THE PREFERRED EMBODIMENTS

Figure 3:
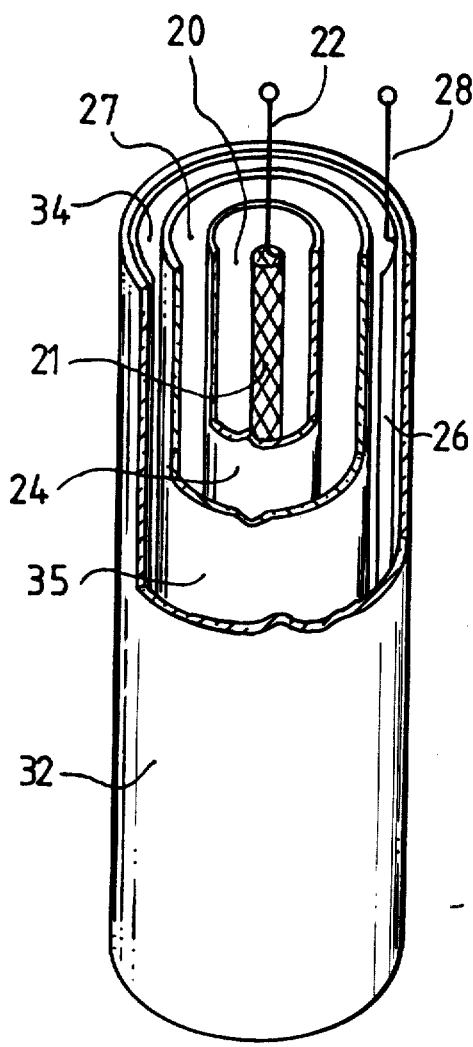
FIG. 3 is a perspective view of the construction in principle of an apparatus with two glow-discharge chambers, shown partly in section.

The constructional principle of the apparatus of the invention can be seen from FIG. 1: a plate-form electrode 21 is disposed in a hermetically sealed glow-discharge chamber and is connected to a pole 23 of a voltage source through a conductor 22. The glow-discharge chamber 20 is closed externally by a separator wall in the form of a tube 24. The wall thickness of the glass is under one millimeter and the tube 24 is tightly sealed at the top and the bottom, and at the top the conductor 22 is melted into a neck 25.

The unit made in this way is so embraced by a tubular counter electrode 26 that an annular chamber is defined between the outer wall of the tube 24 and the inner wall of the counter electrode 26, this being left free and forming the ozonisation chamber 27. The tubular counter electrode 26 is connected through a conductor 28 to the second pole 29 of the voltage source.

The free gap between the inner wall of the counter electrode 26 and the outer wall of the tube 24 is less than one millimeter and in the embodiment illustrated is 0.13 mm. A medium to be ozonised, in the embodiment concerned, passes from below through an inlet 30 into the ozonisation chamber 27 and leaves it at the top through an outlet 31 in the form of the ozone-enriched mixture. The embodiment of FIG. 1 is a small apparatus for ozone production, and in this the minimal heat-up of the air between the inlet 30 and the outlet 31, which has a chimney-effect, ensures adequate air passage through an ozonisation chamber 27. The counter electrode 26 may be constituted by a tubularly shaped network. This counter electrode 26 is at earth potential, making the device contact-safe. The embodiment of FIG. 2 can be used for larger plants, and its length and other geometrical dimensions can be suited to the sphere of use envisaged. This apparatus is basically of the same construction as the embodiment illustrated in FIG. 1. Apart from this electrode and counterelectrode the apparatus is made completely of glass, and particularly from glass tubes. Disposed in the relatively long tube 24 constituting the separator wall and hermetically sealed at the top and bottom is a cylindrical electrode 21 which is made of a metallic net and extends practically over the complete length of this tube 24. The tube 24 is enclosed in an outer tube 32 which has an inner diameter of smaller size than the outer diameter of the tube 24. As a result the free width of the ozonisation chamber 27 is less, which enables higher enrichment of the air in the ozone to be achieved. This air flows through an inlet 30, formed by a pipe connection, into the ozonisation chamber 27 and leaves it at the top through an outlet 31 likewise formed as a pipe connection. The reduced pressure in the glow-discharge chamber 20, which amounts to several hundred Pascal can be controlled and maintained by a vacuum cock 33, and furthermore gas can be taken out or added to set the operating parameters at the optimum figures. In practical operation the gas pressure is set so that an optimum degree of efficiency is set under the conditions mentioned above. A stable glow-discharge is a prerequisite for this. The counter electrode 26 is, like the electrode 21, made from a metallic net and in the form of a cylinder. It lies close to the inner wall of the outer tube 32. In a modified construction it may bear against the outer jacket of the tube 24 or be disposed between the two tubes 24 and 32.

Because of the grid-form of the electrodes 21, 26 the capacity of the apparatus is small so that the electrical losses are also small.

FIG. 3 shows an embodiment in which the tubular counter electrode 26 surrounds a second annular and outer glow-discharge chamber 34 in addition to the inner glow-discharge chamber 20 of the preceding embodiment. Between the two electrodes 21, 26 there is, beside the first separator wall consisting of a tube 24, a second separator wall 35 also of tubular form and concentrically surrounding the tube 24. Externally of this, the second glow-discharge chamber 34 is sealed airtightly by an outer tube 32.

The ozonising chamber 27 in this embodiment is disposed between the two separator walls 34, 35 and both electrodes 21, 26 are in the form of plasma electrodes. As a result the capacity between these two electrodes 21, 26 is exceedingly small even at high frequency so that electrical losses remain small. Further both electrodes 21, 26 are completely capped off to protect them against contact and oxidation etc. The apparatus according to FIG. 3 is thus suitable for use with highly ozone-charged media.

In an embodiment modified relatively to that of FIG. 3 a cylindrical counter electrode is arranged concentrically to the tubes 24, 32, 35 in the ozonisation chamber 27 and those between the tubes 24 and 32, which for example may be constructed as in the embodiment of FIG. 2. Both electrodes installed in the glow-discharge chambers 20 and 24 operate oppositely to these counter electrodes, for example equiphase, for which purpose they may be connected together or be arranged in counterphase, and this is preferred.

In the embodiment of FIG. 4 use is made of a counter electrode 26 which is mounted directly on the outer jacket of the tube 24 acting as a separator wall. It is of net form so that the electric field may be set up externally. Counter electrodes 26 of this nature may for example be sputtered or deposited on the outer jacket of tube 24. In a modified arrangement an insulating layer corresponding to the counter electrode 26, that is to say also of perforate formation, can be first of all applied to the outer wall of the tube 24 and the actual counter electrode 26 deposited on this layer. This construction of counter electrode 26 contributes to a further degree of efficiency of the complete apparatus.

Figure 5:
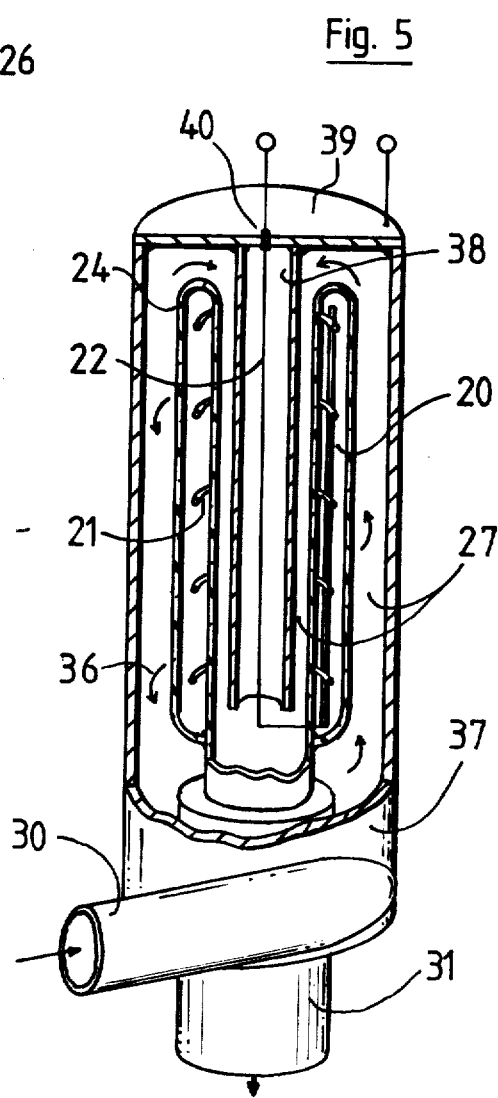
FIG. 5 is a longitudinal section through an embodiment with an annular glow-discharge chamber.

In the embodiment of FIG. 5 the glow-discharge chamber 21 is of annular form. Disposed at both sides of this annular chamber is the ozonisation chamber 27 through which the medium flows in accordance with the arrows 36. The air enters through an inlet 30, which takes the form of a pipe connection and is arranged tangentially to the outer tubular wall and at a very small acute angle to the longitudinal axis of the apparatus. This produces a helical flow, and overall the dwell period of the air to be ozonised is increased so that the degree of ozonisation at the outlet 31 is relatively high. Where the dust content of the air forced in at the inlet 30 is heavy a separation of cyclonic form can be carried out by the appropriate construction of the walls of the ozonisator of FIG. 5.

The apparatus according to FIG. 5 is primarily made of metal, and in particular the two counter electrodes 26 are made up of two metal tubes 37, 38. In the outer metal tube 37 the inlet 30 which comes in tangentially, is disposed at the bottom and the inner metal tube 38 is secured at the opposite end of the metal tube 30 in a cover 39 closing the metal tube 37. Passing into the inner metal tube 38 is the conductor 27 to the electrode and this is insulated where it passes into the cover 39 by means of a grommet 40.

The outlet 31 in the form of a pipe connection is inserted at the bottom into an annular lower closure (not shown in FIG. 5) of the metal tube 37 and projects into the inner space thereof. Mounted on the upper free end of this outlet 31 is a glow-discharge part which is made of glass and is defined between two end and interconnected pipes 24 surrounding a grid-form electrode 21. The glow-discharge part is secured to the upper free end of the outlet 31.

FIG. 6 gives an illustration of the time sequence of the voltage applied to the electrodes 21, 26. The apparatus of the invention affords a relatively frequent variation in electrical supply and a sequence such as that shown in FIG. 6 is preferred. Narrow rectangular pulses (binary signals) which follow one another in uniform or varying time intervals are here envisaged. A unipolar voltage, as illustrated in FIG. 6 has been found suitable because it can be electrically achieved quite readily. Reference is here made to DE-OS No. 29 42 506.

The pulses are of under 6 kilovolt value. This underscores the advantage of the invention with regard to small operating and priming voltages, (about five times smaller).

The glow-discharge chamber 20 is preferably filled with an atomic gas. Inert, gases, particularly neon, have been proven advantageous. The operating parameters are dependent on the type of gas used, and the same applies to the pressure etc., thereof.

In addition to glass, as described above, any insulating material is basically suitable for the separator wall, provided this is not attacked by ozone and the glow gas or any further gases which might be present. Of advantage however is a separator wall with very high dielectric constants, for example ceramic bodies as used in condensers.

The glow light of the glow-discharge device may be related to the optical production of ozone where it is of such a short wave such as 250 mm and the separator wall is penetrable by this radiation.

In the case of large plants, cooling of the apparatus of the invention, for example by means of air or water, is necessary and can be carried out in a known conventional fashion.

The use of an external Faraday cage enclosing the complete apparatus will prevent any damaging radiation reaching the exterior.

The control of the quantity of ozone produced and thus the concentration in the medium is particularly simple in this invention by the fact that the frequency of the pulses per unit time can be varied very simply. A control of this nature has not hitherto been possible in known apparatus because of the increased capacity thereof.

We claim:

1. An apparatus for producing ozone, comprising:
   a first electrode;
   a second, annular electrode surrounding the first electrode and spaced therefrom;
   a first tubular wall of electrically insulating material disposed between the electrodes;
   a first sealed glow discharge chamber surrounding one of the electrodes, formed at least in part by the tubular wall, and filled with a charge of an ionizable gas;
   an ozonization chamber disposed between the electrodes, formed at least in part by the tubular wall, and having an inlet for an oxygen charged medium and an outlet for the medium as ozone enriched; and,
   electrically conductive means for connecting the electrodes to an electrical power source, whereby ionized gas in the glow discharge chamber forms a plasma electrode.

2. The apparatus of claim 1, further comprising:
   a second tubular wall of electrically insulating material disposed between the electrodes, the ozonization chamber being defined between the tubular walls; and,
   a second sealed glow discharge chamber surrounding the other electrode, each of the glow discharge chambers being formed at least in part by one of the tubular walls, each being filled with a charge of an ionizable gas, and each forming a plasma electrode when energized.

3. The apparatus of claims 1 or 2, wherein each said separating wall is made from a material having a very high dielectric constant.

4. The apparatus of claim 3, wherein the material is ceramic.

5. The apparatus of claims 1 or 2, wherein each said separating wall is pervious to radiation having a wavelength less than 250 nanometers, and the gas in each said glow discharge chamber emits, upon ionization, radiation having a wavelength less than 250 nanometers.

6. The apparatus of claim 1, further comprising a pipe connection forming the inlet to the ozonization chamber, the pipe connection defining a flow axis into the ozonization chamber which is tangential to the ozonization chamber.

7. The apparatus of claim 6, wherein the flow axis of the pipe connection is disposed at an acute angle relative the axis of the ozonization chamber.

8. The apparatus of claims 1 or 2, wherein each said glow discharge chamber comprises a vacuum cock.

9. The apparatus of claim 1, further comprising electrical means for generating voltage pulses at a frequency in the range of 10 to 60 KHz, for application to the electrically conductive connecting means.

10. A method for producing ozone, comprising the steps of:
    surrounding a first electrode by a second annular electrode;
    disposing at least one tubular wall of electrically insulating material between the electrodes;
    sealing at least one of the electrodes in a glow discharge chamber, formed at least in part by the tubular wall;
    filling the glow discharge chamber with an ionizable gas, at low pressure;
    energizing the electrodes by applying an electrical potential therebetween in the form of voltage pulses at a frequency in the range of 10 to 60 KHz; and,
    moving an oxygen charged medium between the electrodes, the ionized gas in the glow discharge chamber forming a plasma electrode.

11. The method of claim 10, further comprising the steps of:
    disposing a second tubular wall of electrically insulating material between the electrodes;
    sealing the other electrode in a second glow discharge chamber, each of the glow discharge chambers being formed at least in part by one of the tubular walls;
    filling the second glow discharge chamber with an ionizable gas, at low pressure; and,
    moving the oxygen charged medium between the tubular walls, the space therebetween defining an ozonization chamber disposed between two plasma electrodes.

* * * * *

UNITED STATES PATENT AND TRADEMARK OFFICE
CERTIFICATE OF CORRECTION

PATENT NO. : 4,417,966

DATED : 11/29/83

INVENTOR(S) : Ralf Krauss and Rainer Koehne

It is certified that error appears in the above-identified patent and that said Letters Patent is hereby corrected as shown below:

In column 1, lines 51-52, "liklihood" should read --likelihood--; column 1, line 65, "unwnted" should read --unwanted--.

In column 2, line 30, "relible" should read --reliable--; column 2, line 41, "etween" should read --between--; column 2, line 44, "flank" should be omitted.

In column 3, line 2, "tht" should read --that--; column 3, line 58, "shaped" should be replaced by --form--; column 3, line 61, "hose-form" should read --hose-shaped--; column 3, line 61, "shape" should be omitted.

In column 4, line 68, "this" should read --the--.

In column 6, line 49, "DE-OS No. 29 42" should read --DE-OS 29 42--; column 6, line 56, "inert," should be --inert--.

Signed and Sealed this

Twenty-fifth Day of December 1984

[SEAL]

Attest:

GERALD J. MOSSINGHOFF

Attesting Officer      Commissioner of Patents and Trademarks

UNITED STATES PATENT AND TRADEMARK OFFICE
CERTIFICATE OF CORRECTION

PATENT NO. : 4,417,966
DATED : 11/29/83
INVENTOR(S) : Ralf Krauss and Rainer Koehne It is certified that error appears in the above-identified patent and that said Letters Patent is hereby corrected as shown below:

In column 1, lines 51-52, "liklihood" should read --likelihood--; column 1, line 65, "unwnted" should read --unwanted--.

In column 2, line 30, "relible" should read --reliable--; column 2, line 41, "etween" should read --between--; column 2, line 44, "flank" should be omitted.

In column 3, line 2, "tht" should read --that--; column 3, line 58, "shaped" should be replaced by --form--; column 3, line 61, "hose-form" should read --hose-shaped--; column 3, line 61, "shape" should be omitted.

In column 4, line 68, "this" should read --the--.

In column 6, line 49, "DE-OS No. 29 42" should read --DE-OS 29 42--; column 6, line 56, "inert," should be --. Inert--.

UNITED STATES PATENT AND TRADEMARK OFFICE
CERTIFICATE OF CORRECTION

PATENT NO. : 4,417,966

DATED : 11/29/83

INVENTOR(S) : Ralf Krauss and Rainer Koehne

It is certified that error appears in the above-identified patent and that said Letters Patent is hereby corrected as shown below:

This certificate supersedes certificate of correction issued December 25, 1984.

Signed and Sealed this

Twenty-second Day of October 1985

[SEAL]

Attest:

DONALD J. QUIGG

Attesting Officer

Commissioner of Patents and
Trademarks—Designate